(12) United States Patent
Mori et al.

(10) Patent No.: US 10,407,184 B2
(45) Date of Patent: Sep. 10, 2019

(54) DEBRIS REMOVAL DEVICE AND DEBRIS REMOVAL METHOD

(71) Applicant: IHI Corporation, Koto-ku (JP)

(72) Inventors: Hatsuo Mori, Tokyo (JP); Taku Izumiyama, Tokyo (JP); Kozue Hashimoto, Tokyo (JP); Satomi Kawamoto, Tokyo (JP); Keiichi Hirako, Tokyo (JP)

(73) Assignee: IHI Corporation, Koto-ku (JP)

( * ) Notice: Subject to any disclaimer, the term of this patent is extended or adjusted under 35 U.S.C. 154(b) by 306 days.

(21) Appl. No.: 15/397,348

(22) Filed: Jan. 3, 2017

(65) Prior Publication Data

US 2017/0113818 A1  Apr. 27, 2017

Related U.S. Application Data

(63) Continuation of application No. PCT/JP2015/077537, filed on Sep. 29, 2015.

(30) Foreign Application Priority Data

Sep. 30, 2015 (JP) ................................. 2014-199569

(51) Int. Cl.
  *B64G 1/36* (2006.01)
  *B64G 1/10* (2006.01)
  *B64G 1/64* (2006.01)

(52) U.S. Cl.
  CPC ............. *B64G 1/1078* (2013.01); *B64G 1/64* (2013.01); *B64G 1/648* (2013.01)

(58) Field of Classification Search
  CPC ......... B64G 1/64; B64G 1/648; B64G 1/1078
  See application file for complete search history.

(56) References Cited

U.S. PATENT DOCUMENTS 4,219,171 A    8/1980  Rudmann
6,299,107 B1  10/2001  Kong et al.
(Continued)

FOREIGN PATENT DOCUMENTS

EP  2 671 804 A1  12/2013
EP  2 746 163 A1   6/2014
(Continued)

OTHER PUBLICATIONS

International Search Report dated Dec. 15, 2015 in PCT/JP2015/077537, filed on Sep. 29, 2015 (with English Translation).
(Continued)

*Primary Examiner* — Richard G Davis
(74) *Attorney, Agent, or Firm* — Oblon, McClelland, Maier & Neustadt, L.L.P.

(57) ABSTRACT

A debris removal device includes: an end mass adapted to approach debris to be removed; a debris capture device separably-mounted on the end mass; and a tether connecting the debris capture device and the end mass to each other. The debris capture device includes a harpoon adapted to penetrate into the debris, a shooting device adapted to shoot the harpoon, a guide member positioned to come into contact with the surface of the debris to adjust the shooting angle of the harpoon with respect to the surface of the debris, and a switch that sends the shooting signal to the shooting device. When the harpoon is penetrated into the debris, the end mass is separated from the debris capture device, and the tether is released into outer space.

11 Claims, 10 Drawing Sheets

(56) References Cited

U.S. PATENT DOCUMENTS

| | | | |
|---|---|---|---|
| 6,969,030 B1 * | 11/2005 | Jones ................... | B64G 1/646 244/115 |
| 2014/0367523 A1 | 12/2014 | Kitazawa et al. | |
| 2015/0151856 A1 * | 6/2015 | Reed ................... | B64G 1/1078 244/158.4 |

FOREIGN PATENT DOCUMENTS

| | | |
|---|---|---|
| JP | 11-277313 | 10/1999 |
| JP | 2010-285137 | 12/2010 |
| RU | 2 510 359 C1 | 3/2014 |
| WO | WO 2013/065795 A1 | 5/2013 |
| WO | WO 2013/182616 A1 | 12/2013 |

OTHER PUBLICATIONS

Written Opinion dated Dec. 15, 2015 in PCT/JP2015/077537, filed on Sep. 29, 2015.
Extended Search Report dated Jan. 19, 2018 in European Patent Application No. 15847325.6.
Combined Office Action and Search Report dated May 4, 2018 in Russian Patent Application No. 2017114364 (with English language translation) citing references AO and AP therein, 11 pages.

* cited by examiner

DEBRIS REMOVAL DEVICE AND DEBRIS REMOVAL METHOD

CROSS REFERENCE TO RELATED APPLICATIONS

This application is a continuation application of International Application No. PCT/JP2015/077537 filed on Sep. 29, 2015, which claims priority to Japanese Patent Application No. 2014-199569 filed on Sep. 30, 2014, the entire contents of which are incorporated herein by reference.

BACKGROUND

Technical Field

The present disclosure relates to a debris removal device and a debris removal method, and particularly relates to a debris removal device and a debris removal method which are suitable for removing debris drifting in outer space, such as satellites and rockets which are not used anymore and are orbiting the Earth.

Description of the Related Art

Currently, artificial satellites, such as military satellites, communications satellites, scientific satellites, observation satellites, and navigation satellites, are orbiting for various purposes. When the artificial satellites break down and do not function anymore, or when they finish their assignments and reach the end of their service life, the artificial satellites are often left in orbit, forming debris (space junk). In addition, the wreckage of rockets and the like used for launching artificial satellites and the like are also left as debris in orbit. Currently, several thousand pieces or more of debris are orbiting, and are entering a self-multiplication stage, where the number of pieces is increased by natural collisions. To avoid the self-multiplication of debris, it is necessary to remove at least roughly five pieces of debris per year. The debris are attracted by the terrestrial gravitation, and eventually fall and disappear; however, the natural falling requires long periods of time, and it is not efficient. In this respect, methods for actively removing the debris have been already proposed.

Japanese Patent Application Publication No. 2010-285137 discloses a debris removal method in which a pressure reception device for receiving a trace amount of air and solar radiation pressure is formed of a film material having a circular or polygonal shape, and this pressure reception device is attached to space debris already orbiting in outer space or a spacecraft to be launched later by a cord. Thus, the space debris or the spacecraft which has been used is caused to fall down to the ground or to change its orbit to protect an important orbit.

International Publication No. WO2013/065795 discloses a debris removal method in which a debris removal device observes the motion of target debris, and calculates the capturing position and capturing attitude in which a harpoon can be shot into the target debris. Then, the debris removal device is moved to take the capturing position and the capturing attitude determined by the calculation, and then the harpoon is shot into the target debris. Afterwards, the target debris is decelerated.

SUMMARY

In the methods described above, a harpoon is shot into debris to attach a pressure reception device to the debris. The method in which a harpoon is shot is advantageous in that the debris can be captured at a distant place, but it has to generate the kinetic energy necessary for the harpoon to penetrate into the debris at the shooting of the harpoon. Accordingly, excessive reaction force is generated in the satellite from which the harpoon is shot, and hence the strength of the satellite has to be increased, which causes an increase in weight. In addition, another problem would be presented in which debris cannot be captured precisely, because the harpoon would miss the debris, the harpoon would be rebounded by the surface of the debris, or the harpoon would penetrate completely through the debris.

An object of the present disclosure is to provide a debris removal device and a debris removal method, which are capable of reducing the reaction force generated at the shooting of the harpoon, and are capable of capturing debris precisely.

An aspect of the present disclosure provides a debris removal device for capturing debris drifting in outer space, including: an end mass adapted to approach debris to be removed; a debris capture device separably-mounted on the end mass; and a tether connecting the debris capture device and the end mass to each other, wherein the debris capture device includes a harpoon adapted to penetrate into the debris, a shooting device adapted to shoot the harpoon, a guide member positioned to come into contact with the surface of the debris to adjust the shooting angle of the harpoon with respect to the surface of the debris, and a switch that sends the shooting signal to the shooting device, wherein, when the harpoon is penetrated into the debris, the end mass is separated from the debris capture device and the tether is released into outer space.

According to this debris removal device, the harpoon is not shot at a distant point, but the shooting angle of the harpoon is adjusted by causing the debris capture device to approach the debris, and by bringing the guide member into contact with the surface of the debris, so that the harpoon can be shot at an appropriate shooting angle, at a position near the surface of the debris. For this reason, it is possible to reduce the necessary kinetic energy in shooting at the debris, and the reaction force can be reduced. In addition, since the harpoon is shot after the shooting angle is adjusted at a position near the debris, the possibility that the harpoon will miss the debris, be rebounded, or completely penetrate through the debris can be reduced, so that the debris can be captured precisely.

BRIEF DESCRIPTION OF THE DRAWINGS

FIG. 4A shows an approaching state. FIG. 4B shows a shooting-angle adjusting state. FIG. 4C shows a shooting-angle adjustment completion state.

FIG. 5A shows a shooting state. FIG. 5B shows an end mass separating state. FIG. 5C shows a tether-releasing state.

FIG. 6A shows a moving state. FIG. 6B shows an approaching state. FIG. 6C shows a capturing state.

FIG. 7A shows a departing state. FIG. 7B shows a tether-releasing state.

FIG. 8A shows a side view. FIG. 8B shows a front view.

FIG. 9A shows a third embodiment. FIG. 9B shows a fourth embodiment.

DESCRIPTION OF THE EMBODIMENTS

Figure 1:
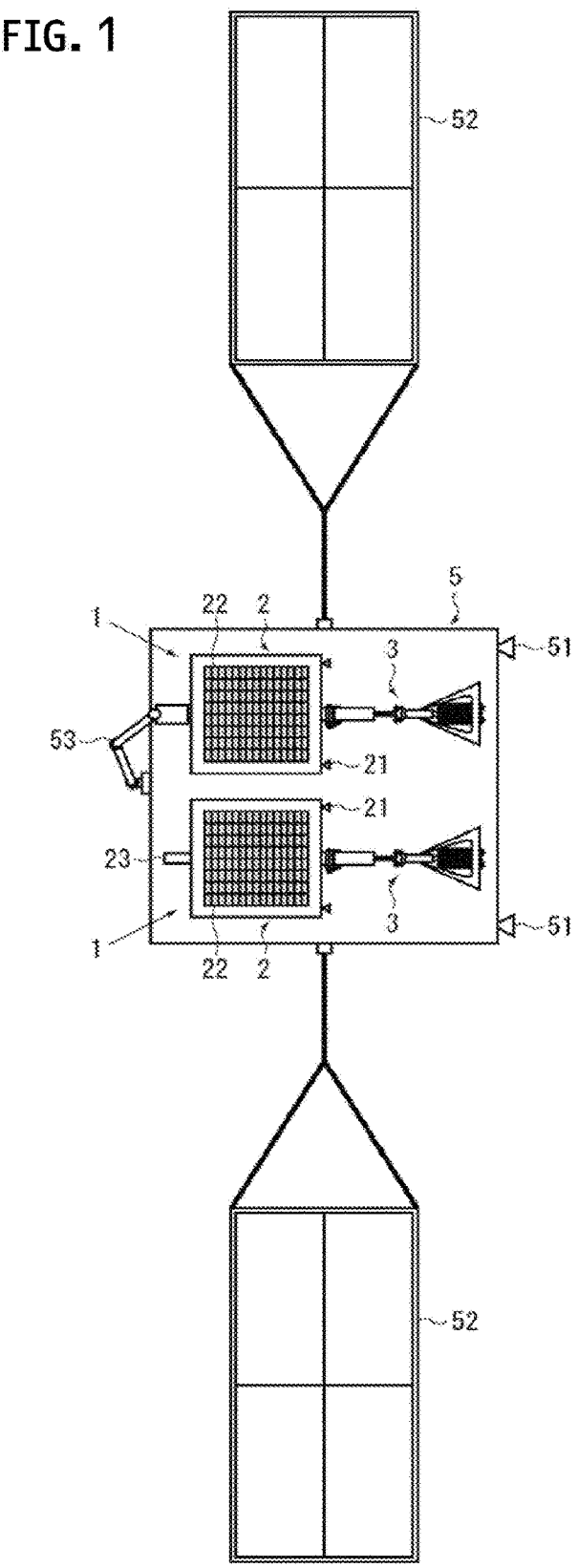
FIG. 1 is a top view showing debris removal devices according to a first embodiment of the present disclosure that shows a state where the debris removal devices are accommodated into a mother ship.
Figure 2:
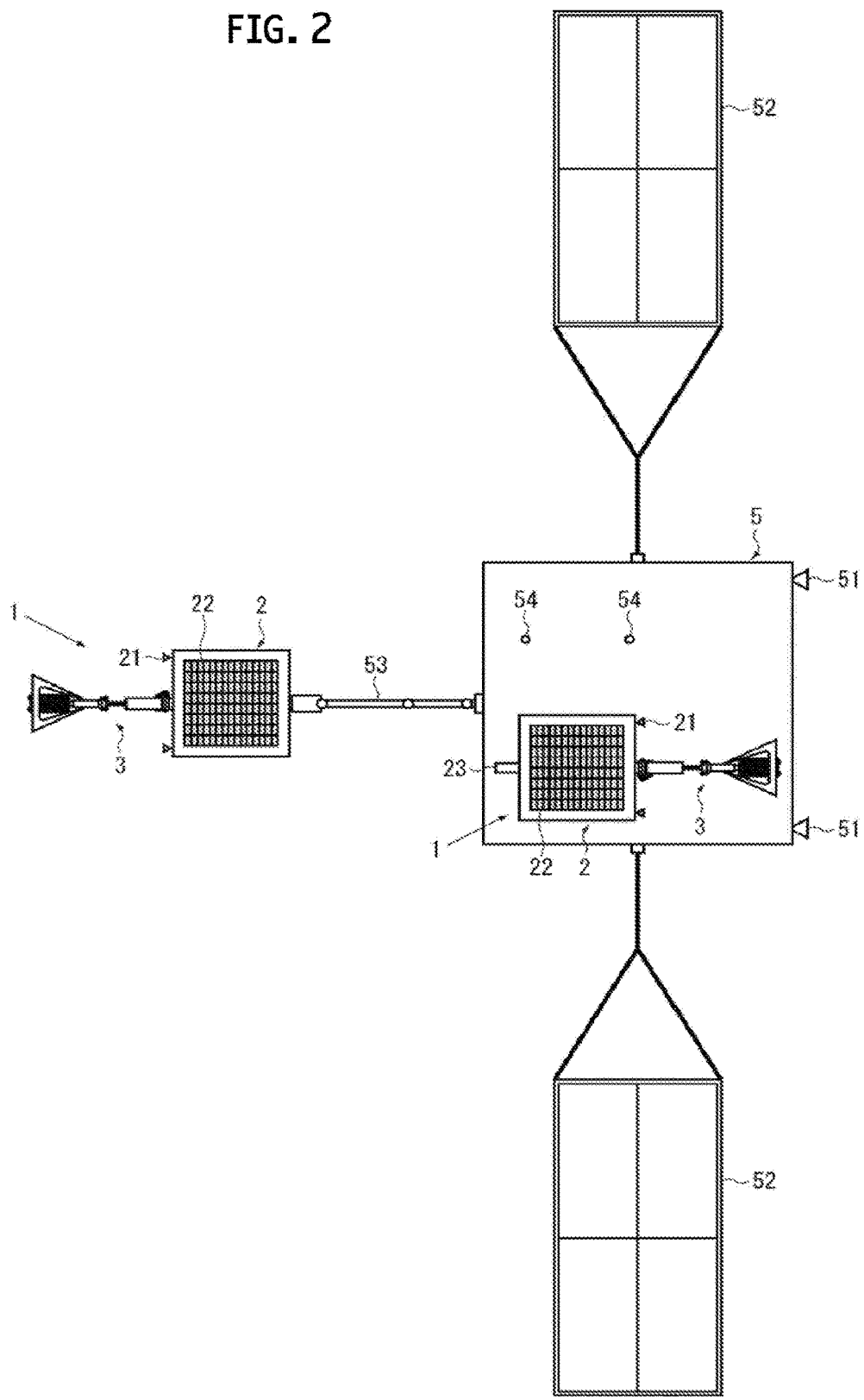
FIG. 2 shows a state where a debris removal device shown in FIG. 1 adopts a capturing attitude.
Figure 3:
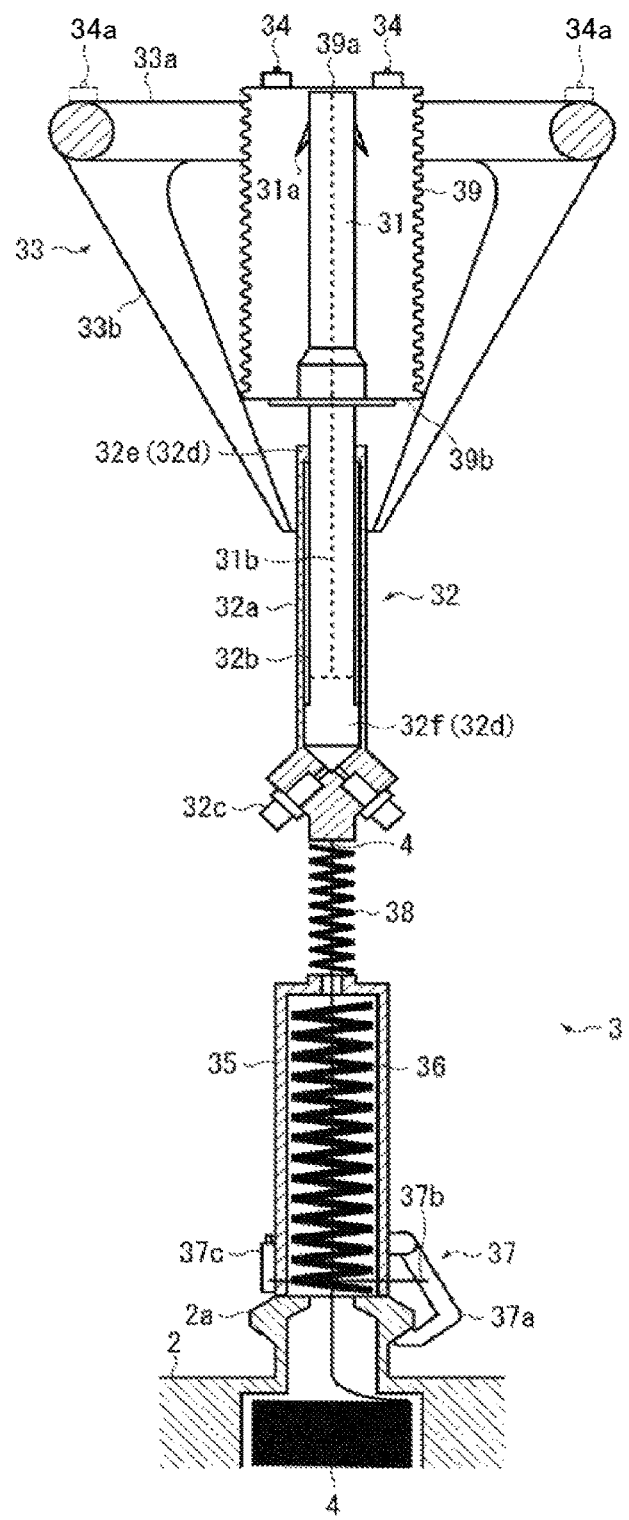
FIG. 3 is a partial lateral cross-sectional view showing a debris capture device of a debris removal device shown in FIG. 1.

Hereinafter, several embodiments of the present disclosure are described by using FIGS. 1 to 10. Here, FIG. 1 is a top view showing debris removal devices according to a first embodiment of the present disclosure, showing a state where the debris removal devices are accommodated in a mother ship. FIG. 2 shows a state where a debris removal device shown in FIG. 1 is assuming a capturing attitude. FIG. 3 is a partial lateral cross-sectional view showing a debris capture device of a debris removal device shown in FIG. 1.

A debris removal device 1 according to a first embodiment of the present disclosure is a device that captures debris drifting in outer space, and removes the debris from orbit. As shown in FIGS. 1 to 3, the debris removal device 1 includes: an end mass 2 adapted to be capable of approaching debris X to be removed; a debris capture device 3 separably-mounted on the end mass 2; and a tether 4 connecting the debris capture device 3 and the end mass 2 to each other. The debris capture device 3 includes: a harpoon 31 capable of penetrating into the debris X; a shooting device 32 for shooting the harpoon 31; a guide member 33; and switches 34 that send a shooting signal to the shooting device 32. The guide member 33 is positioned to be capable of coming into contact with the surface of the debris X, and adjusts the shooting angle of the harpoon 31 with respect to the surface of the debris X. After causing the harpoon 31 to penetrate into the debris X, the debris removal device 1 separates the end mass 2 from the debris capture device 3 to release the tether 4 into outer space.

The end mass 2 is a mass body for deploying the tether 4 in outer space by utilizing gravity acting on the end mass 2 itself, the thrust of a thruster, or the like. The end mass 2 may also be used as a container that accommodates a controlling device of the debris capture device 3, the tether 4, and the like. For example, as shown in FIG. 3, the tether 4 is accommodated in the end mass 2 while being wound like a coil, and the end mass 2 has a tether release port 2a through which the tether 4 is led to the outside.

In addition, the end mass 2 may include a propulsion system 21 (for example, a thruster or the like) for controlling the moving direction and the attitude of the end mass 2 during the deployment of the tether 4. A solar cell panel 22 may be provided on the surface of the end mass 2. The solar cell panel 22 constitutes a solar power generation device (electric power source) for supplying electric power to the debris capture device 3. Note that the propulsion system 21 and the electric power source are not limited to those having the configurations shown in the drawings, but may be omitted as appropriate.

For example, the debris removal device 1 moves as a small satellite, while being mounted on the mother ship 5, as shown in FIG. 1. The mother ship 5 includes, for example, a propulsion system 51 such as a thruster, solar cell paddles 52 that supply electric power, a robot arm 53 that holds and manipulates the debris removal device 1, and a fixation portion 54 (for example, opening portions) for fixing the end mass 2 to the mother ship 5, as shown in FIGS. 1 and 2. The mounting of the debris removal device 1 (the end mass 2) on the mother ship 5, including the propulsion system 51 as described above, can eliminate the need for a propulsion system and a large electric power source of the debris removal device 1, so that the debris removal device 1 can be simplified and reduced in weight. Note that, for example, two debris removal devices 1 are provided on each of the upper surface and the lower surface of the mother ship 5 (four debris removal devices 1 in total); however, the positions and the number of the debris removal devices 1 are not limited thereto.

In addition, the end mass 2 includes a grip portion 23 at a rear end portion thereof to be held by the robot arm 53. The shape of the grip portion 23 is not limited to the shape shown in the drawings, as long as the robot arm 53 can hold the grip portion 23 having such a shape. The mother ship 5 moves in a state where the debris removal devices 1 are accommodated by fixation onto the surfaces as shown in FIG. 1, until the process proceeds to an operation of capturing the debris X. Then, when the mother ship 5 has approached the debris X to be removed and proceeds to the capturing operation, the mother ship 5 causes the robot arm 53 to detach the end mass 2 from the surface of the mother ship 5. Then, by causing the robot arm 53 to linearly extend and face the front (by extending the robot arm 53 frontward), the position of the debris removal device 1 is determined in a state where the front end (in the shooting direction of the harpoon 31) of the debris removal device 1 faces the front, as shown in FIG. 2.

In addition to the harpoon 31, the shooting device 32, the guide member 33, and the switches 34, the debris capture device 3 includes the following components, as shown in FIG. 3. Specifically, the debris capture device 3 includes a casing 35 connected to the tether release port 2a of the end mass 2, a coil spring 36 accommodated in the casing 35, and a lock device 37 for fixing the casing 35 to the tether release port 2a. In addition, the debris capture device 3 includes a buffer 38, provided between the shooting device 32 and the casing 35.

The casing 35 has a substantially tubular shape, and has a diameter that allows the casing 35 to come into contact with the front end surface of the tether release port 2a. The rear end portion of the casing 35 is in contact with the front end surface of the tether release port 2a, and is opened to the rear. In addition, the coil spring 36 is accommodated in the casing 35 in a compressed state, and the rear end of the coil spring 36 is in contact with the front end surface of the tether release port 2a, through an opening of the casing 35. The lock device 37 includes: a hook 37a capable of engaging with an annular protrusion formed on an outer peripheral surface of a front end portion of the tether release port 2a; a wire 37b that restrains the hook 37a to an engaged state; and a wire cutter 37c that cuts the wire 37b. Note that the shape and the configuration of the lock device 37 are mere examples, and are not limited to the shape or the configuration shown in the drawings.

The wire 37b is connected to the hook 37a to keep the engaged state of the hook 37a with the tether release port 2a. To separate the end mass 2 from the debris capture device 3, the lock device 37 causes the wire cutter 37c to cut the wire 37b and remove the restraint on the hook 37a. When the restraint on the hook 37a is removed, the biasing force of the coil spring 36 causes the hook 37a to depart from the tether release port 2a, and the tether release port 2a is pushed rearward, so that the end mass 2 separates from the debris capture device 3.

The shooting device 32 includes: a cylinder 32a that restricts the moving direction of the harpoon 31; a piston 32b inserted through the cylinder 32a; multiple pyrotechnic valves 32c provided on a rear end of the cylinder 32a; and a stopper mechanism 32d. Upon reception of a shooting signal from the switches 34, the pyrotechnic valves 32c release gas into the cylinder 32a to push the piston 32b frontward. Such a configuration of the shooting device 32 is a mere example, and a configuration using an electric motor or the like, for example, may also be employed. In addition, only one pyrotechnic valve 32c may be provided, or a configuration using other pyrotechnics may be employed.

The harpoon 31 is connected to the front end of the piston 32b. The harpoon 31 is a rod-shaped component having a diameter that allows the harpoon 31 to penetrate into the debris X, and has multiple barb portions 31a in the front end portion. The provision of the barb portions 31a makes it possible to inhibit extraction of the harpoon 31 penetrating into the debris X. Note that the front end portion of the harpoon 31 may be pointed, or may have a shape similar to that of the front end of a hole puncher or a cutting tool.

The stopper mechanism 32d sets the penetration depth of the harpoon 31 from the surface of the debris X. The stopper mechanism 32d includes, for example, a wall portion 32e formed in the front end of the cylinder 32a, and a larger-diameter portion 32f formed in the rear end of the piston 32b. When the shooting device 32 shoots the harpoon 31, this configuration enables the larger-diameter portion 32f of the piston 32b to be locked by the wall portion 32e of the cylinder 32a, so that the harpoon 31 can be prevented from being separated from and coming out of the shooting device 32. In other words, the shooting distance (stroke) of the harpoon 31 can be determined by the distance between the wall portion 32e and the larger-diameter portion 32f, so that the penetration depth of the harpoon 31 from the surface of the debris X can be set. Note that the position of the larger-diameter portion 32f is not limited to the rear end of the piston 32b, but the larger-diameter portion 32f may be formed at an intermediate portion of the piston 32b according to the required penetration depth of the harpoon 31.

In addition, a flow path 31b for gas release may be formed over a range from the front end of the harpoon 31 to the piston 32b. The flow path 31b may be formed to extend along the axes of the harpoon 31 and the piston 32b, and to bend at an intermediate portion of the piston 32b toward a side surface of the piston 32b. Even when some gas has built up inside the debris X, this configuration makes it possible to release the gas inside the debris X into outer space, outside the debris X through the flow path 31b by penetrating the harpoon 31 into the debris X, so that the occurrence of explosions of the debris X, a fire, and the like can be suppressed. Note that the flow path 31b may be omitted, as appropriate.

In addition, the debris capture device 3 may include a scattering prevention cover (for example, bellows 39) that covers the outer periphery of the harpoon 31, and has an opening portion (front end portion 39a) positioned forward of the front end of the harpoon 31. The bellows 39 is an elastic body having an accordion-folded portion made of copper, for example, in a side surface portion thereof, and is configured to be stretchable and contractible in the axial direction of the harpoon 31. A rear end portion 39b of the bellows 39 has a bottom portion, and the rear end portion 39b is sealed by connecting the bottom portion to the harpoon 31. Note that the scattering prevention cover is not limited to the bellows 39 shown in the drawings, but may be formed of an elastic body such as a sponge.

Accordingly, when the harpoon 31 penetrates into the debris X, the front end portion 39a of the bellows 39 stays in the surface of the debris X, whereas the rear end portion 39b of the bellows 39 moves with the harpoon 31. Hence, the bellows 39 is compressed in the axial direction. Specifically, when the harpoon 31 penetrates into the debris X, the bellows 39 is pushed against the surface of the debris X, and forms a closed space surrounded by the surface of the debris X, as well as the side surface portion and the rear end portion 39b of the bellows 39. Consequently, it is possible to suppress the scattering of fragments and the like of the debris X formed when the harpoon 31 penetrates into the debris X, and to suppress formation of new pieces of debris. Note that, to prevent the gas from being released into the bellows 39, the flow path 31b for gas release is preferably extended to a portion which is backward of the rear end portion 39b of the bellows 39, and which is a portion of the piston 32b shot out from the cylinder 32a, taking an exposed state in the state where the harpoon 31 is penetrated into the debris X.

Multiple switches 34 are provided in the front end portion 39a of the bellows 39 (specifically, a peripheral portion defining an opening). For example, to detect a state where the front end portion 39a of the bellows 39 is positioned in parallel and opposite to the surface of the debris X, it is preferable to provide at least three or more switches 34. The provision of the switches 34 in the front end portion 39a of the bellows 39, as described above, makes it possible to detect a state where the bellows 39 is positioned in parallel, and is opposite to the surface of the debris X. Then, by causing the harpoon 31 to penetrate into the debris X in this state, it is possible to adjust the shooting angle of the harpoon 31 within an appropriate range, and also to form a closed space easily.

The switches 34 are components that detect a state where the front end portion 39a of the bellows 39 is in contact with the surface of the debris X. The switches 34 are so-called micro switches, which may be of the pressure-sensitive type or the electrification type. The switches 34 are connected to the pyrotechnic valves 32c of the shooting device 32 through cables (not illustrated). Here, when the front end portion 39a of the bellows 39 comes into contact with the surface of the debris X, the switches 34 sends a shooting signal to the pyrotechnic valves 32c. Note that the positions at which the switches 34 are provided are not limited to the front end of the bellows 39, but the switches 34 may be disposed at the front end of the guide member 33, or may be disposed at the front end of a dedicated guide member supported by the debris capture device 3. In addition, any of these arrangements may be combined, as appropriate. In a case where the switches 34 are provided on the front end (for example, at the positions of switches 34a shown in FIG. 3 by the dashed lines) of the guide member 33, the distance between the switches 34a can be set larger, and hence the state where the bellows 39 is positioned in parallel and opposite to the surface of the debris X can be detected more precisely than in the case where the switches 34 are provided at the front end of the bellows 39.

In addition, the guide member 33 is provided outside the bellows 39. The guide member 33 includes, for example, the ring-shaped rim portion 33a disposed at the front end, and a spoke portion 33b supporting the rim portion 33a, which has a substantially circular outer cone shape, having a larger diameter on the front end side. For example, the inner diameter of the rim portion 33a is larger than the outer diameter of the bellows 39, and a plane defined by the front end of the rim portion 33a is substantially perpendicular to the axes of the harpoon 31 and the piston 32b. In addition, the front end portion 39a of the bellows 39 can be substantially flush with the plane defined by the front end of the rim portion 33a, or can project slightly frontward from the plane defined by the front end of the rim portion 33a. A rear end portion of the spoke portion 33b is fixed to the cylinder 32a of the shooting device 32, for example. Note that the rim portion 33a may have a circular ring shape, or a quadrangular ring shape. Further, the shape of the rim portion 33a is not limited to the ring shape, but the rim portion 33a may include multiple members which are arranged away from one another in the circumferential direction, and each of which has, for example, a rod shape, a plate shape, a spherical shape, or the like.

Accordingly, when the debris capture device 3 obliquely approaches the surface of the debris X (while being in the state where the axes of the harpoon 31 and the piston 32b are inclined from the surface of the debris X), the rim portion 33a of the guide member 33 first comes into contact with the surface of the debris X. Then, when the debris capture device 3 is allowed to approach the debris X, the guide member 33 rotates based on the contact point of the guide member 33 (around the contact point), and controls the attitude of the debris capture device 3 so that the entirety of the rim portion 33a can come into contact with the surface of the debris X. In other words, the guide member 33 acts as a self-aligning mechanism of the debris capture device 3, and adjusts the shooting angle of the harpoon 31 with respect to the surface of the debris X. Note that here, it is possible to allow the buffer 38, to be described later, to gently bend to help control the attitude of the debris capture device 3.

The tether 4 accommodated in the end mass 2 passes through the tether release port 2a and the casing 35, and is connected to a rear end portion of the shooting device 32 (the cylinder 32a). The buffer 38 (for example, a spring or the like), which reduces the impact generated when the harpoon 31 is shot, may be provided between the shooting device 32 (the cylinder 32a) and the casing 35. The provision of the buffer 38 makes it possible, by the buffer 38, to absorb the reaction force generated when the harpoon 31 is shot by igniting the pyrotechnic valves 32c. Note that the buffer 38 is not limited to a spring, but may be an elastic body such as rubber. In addition, as described above, the buffer 38 may also have the function of helping the self-alignment of the debris capture device 3.

After the harpoon 31 is penetrated into the debris X, the end mass 2 is separated from the debris capture device 3 so that the tether 4 is released into outer space and deployed. The tether 4 has electrical conductivity, and the Lorentz force acts on the tether 4 based on the relationship between the electric current flowing through the tether 4 and the magnetic field generated by the deployment of the tether 4. Consequently, the tether 4, for example, is pulled in a direction opposite from the advancing direction of the debris X, so that the debris X can be decelerated. Note that, although not illustrated, it is also possible to remove debris X from a congested orbit by spreading the tether in an opposite direction (for example, in a direction away from the earth) to pull and accelerate the debris X in the advancing direction, and to move the debris X to an upper orbit. An end portion of the tether 4 or the end mass 2 may be provided with an electron emitter or an electron collector for actively exchanging electrons with the surrounding outer space.

Figure 4A:
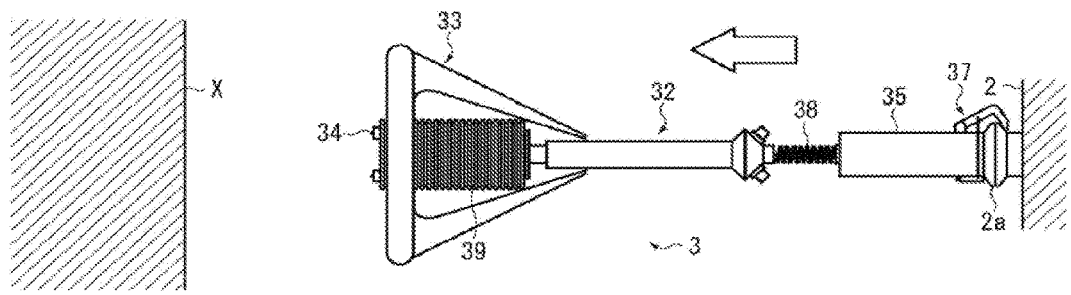
FIGS. 4A to 4C show the operations of a debris capture device.
Figure 4B:
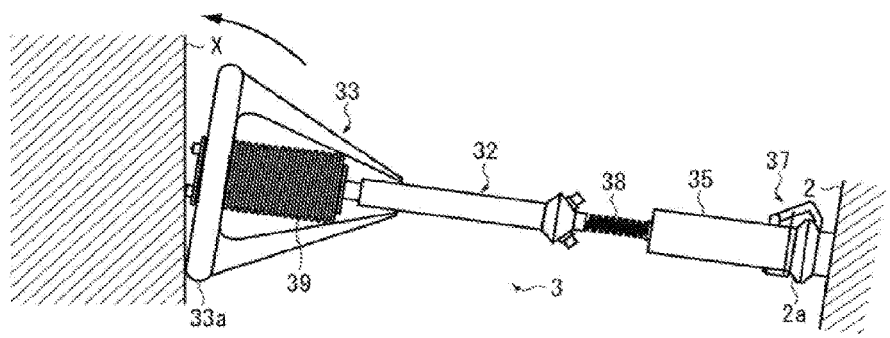
Figure 4C:
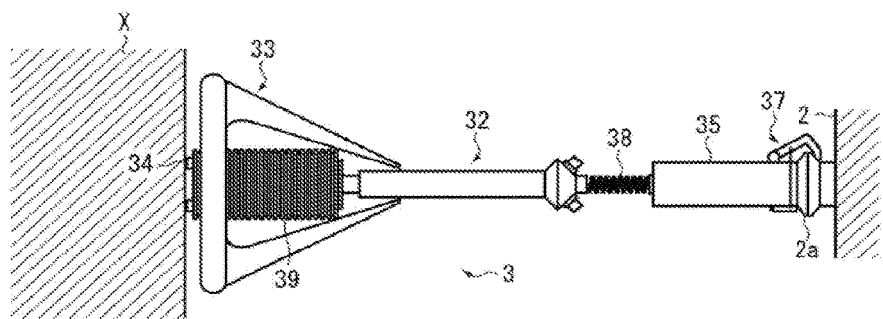
Figure 5A:
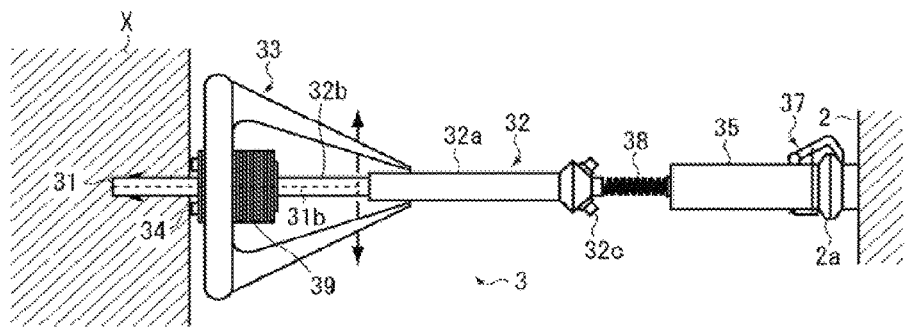
FIGS. 5A to 5C show operations of the debris capture device.
Figure 5B:
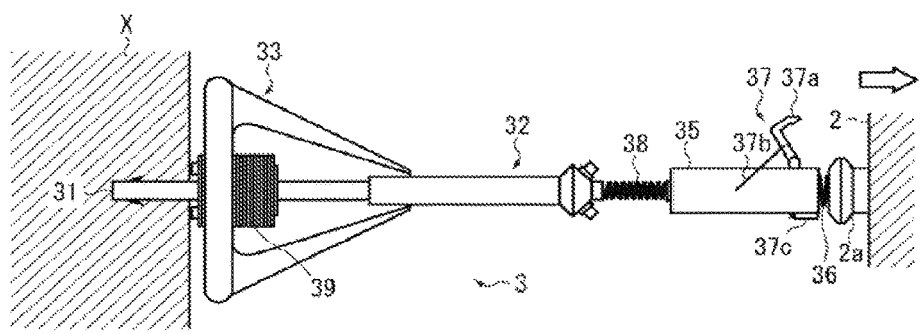
Figure 5C:
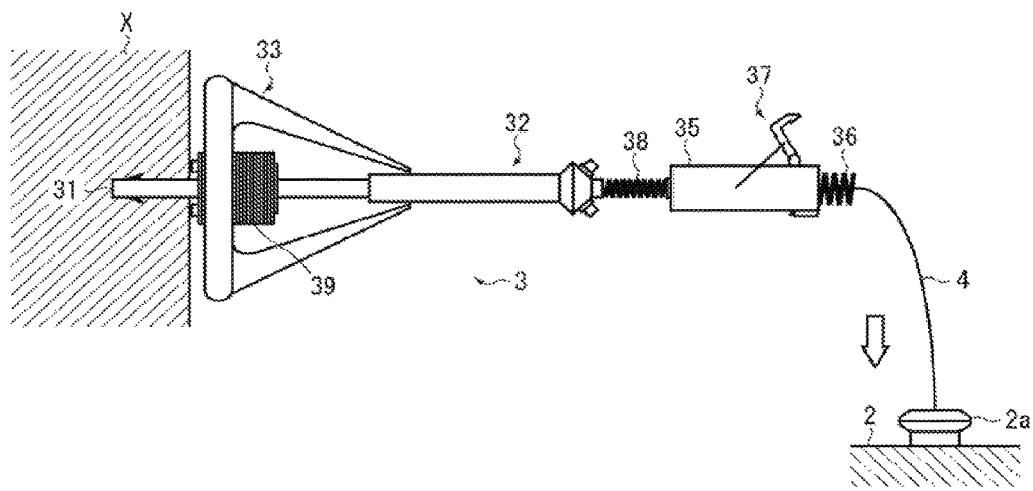

Next, the operations of the debris capture device 3 are described with reference to FIGS. 4A to 5C. Here, FIGS. 4A to 4C show the operations of the debris capture device. FIG. 4A shows an approaching state, FIG. 4B shows a shooting-angle adjusting state, and FIG. 4C shows a shooting-angle adjustment completion state. FIGS. 5A to 5C show the operations of the debris capture device. FIG. 5A shows a shooting state, FIG. 5B shows an end mass separating state, and FIG. 5C shows a tether-releasing state.

As shown in FIG. 4A, the debris capture device 3, in a state of being connected to the end mass 2, is caused to approach debris X, together with the end mass 2. When the debris capture device 3 approaches the debris X, while the axes of the harpoon 31 and the piston 32b are kept in a state of being substantially perpendicular to the surface of the debris X, the switches 34 come into contact with the surface of the debris X as shown in FIG. 4C, and a shooting signal is sent out.

In contrast, when the debris capture device 3 obliquely approaches the surface of the debris X as shown in FIG. 4B, the rim portion 33a of the guide member 33 comes into contact with the surface of the debris X. Then, when the debris capture device 3 is further caused to slowly approach the debris X, the guide member 33 corrects the attitude of the debris capture device 3 based on the contact point of the rim portion 33a. Finally, the attitude of the debris capture device 3 is corrected to a state of being substantially perpendicular to the surface of the debris X, as shown in FIG. 4C.

When the switches 34 come into contact with the surface of the debris X as shown in FIG. 4C, a shooting signal is sent to the shooting device 32 (the pyrotechnic valves 32c), gas is released from the pyrotechnic valves 32c into the cylinder 32a, and the piston 32b is pushed out along the cylinder 32a. By these operations, the harpoon 31 is shot from the shooting device 32, and the harpoon 31 is penetrated into the debris X, as shown in FIG. 5A. Here, the penetration depth of the harpoon 31 is set by the stopper mechanism 32d, and the harpoon 31 is not separated from the shooting device 32, or does not come out of the shooting device 32.

Here, the relative movement between the surface of the debris X and the harpoon 31 pushes and compresses the bellows 39 against the surface of the debris X. Accordingly, a closed space can be formed by the bellows 39 around the penetration portion of the harpoon 31, which makes it possible to suppress the scattering of fragments and the like formed during the penetration of the harpoon 31. In addition, when gas has built up inside the debris X, the gas is released into outer space through the flow path 31b. Note that the reaction force generated at the shooting of the harpoon 31 is absorbed by the buffer 38.

By penetrating the harpoon 31 into the debris X, the debris X can be captured with the debris capture device 3. Next, the debris X is to be decelerated. In this respect, the wire 37b of the lock device 37 is cut, as shown in FIG. 5B. When the wire 37b is cut, the restraint on the hook 37a is removed. Hence, the biasing force of the coil spring 36 accommodated in the casing 35 pushes the end mass 2 in a direction away from the debris capture device 3 into outer space. Then, as shown in FIG. 5C, the end mass 2 separates from the debris capture device 3, and the tether 4 is released into outer space and deployed.

Figure 6A:
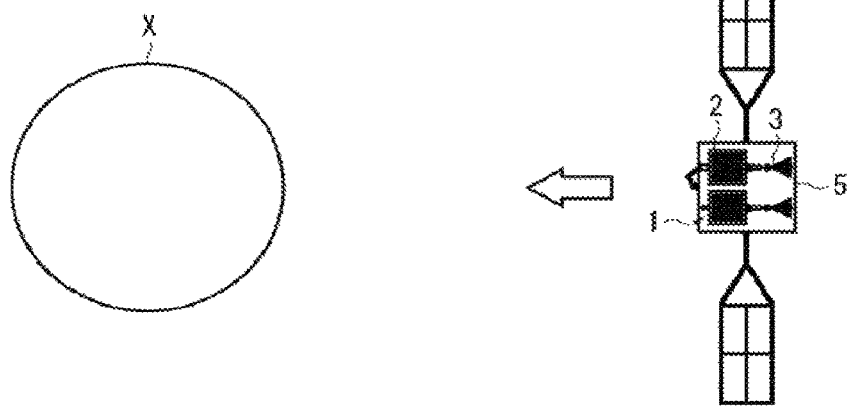
FIGS. 6A to 6C show operations of the debris removal device.
Figure 6B:
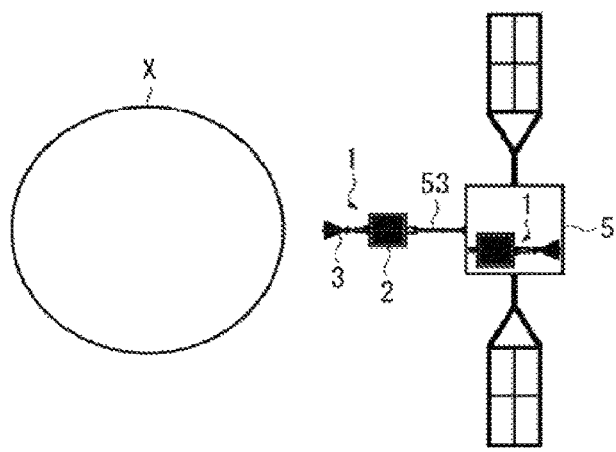
Figure 6C:
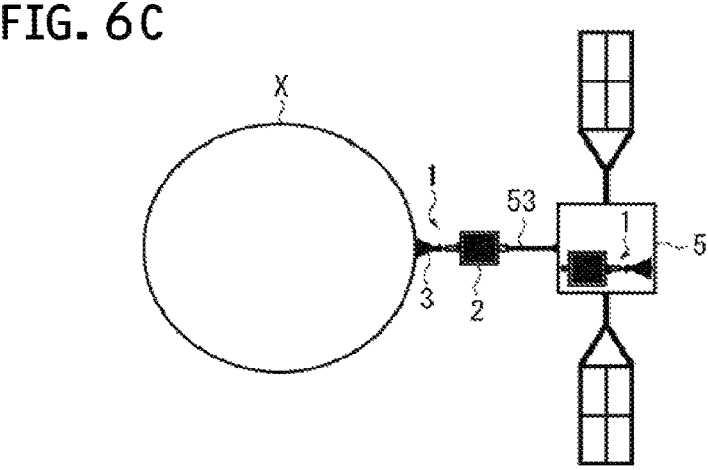
Figure 7A:
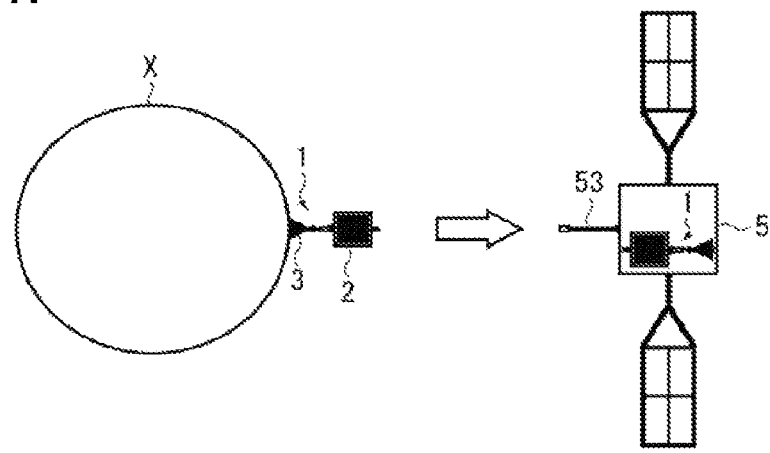
FIGS. 7A to 7B show operations of the debris removal device.
Figure 7B:
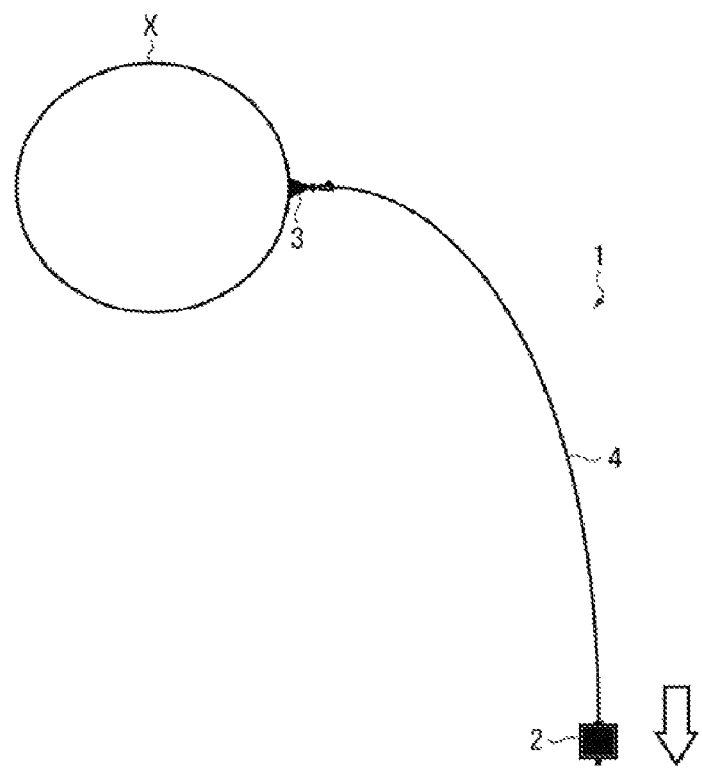

Next, the operations of the debris removal device 1 are described with reference to FIGS. 6A to 7B. Here, FIGS. 6A to 6C show the operations of the debris removal device. FIG. 6A shows a moving state, FIG. 6B shows an approaching state, and FIG. 6C shows a capturing state. FIGS. 7A to 7B show the operations of the debris removal device. FIG. 7A shows a departing state, and FIG. 7B shows a tether-releasing state.

As shown in FIG. 6A, the debris capture device 3, in a state of being mounted on the mother ship 5, moves to the vicinity of the debris X to be removed. The debris X whirls in an orbit with irregular tumbling. The mother ship 5 is introduced, for example, to a position lower than the orbit of the debris X. Then, while approaching the debris X, by using the propulsion system 51, the mother ship 5 is gradually moved into the orbit by centrifugal force.

When the mother ship 5 is introduced into the orbit of the debris X, the mother ship 5 operates the robot arm 53 to separate the end mass 2 and the debris capture device 3 from the mother ship 5, and positions the debris capture device 3 right in front of the mother ship 5, as shown in FIG. 6B.

The mother ship 5 assumes the capturing attitude and moves, while monitoring its own position and the position of the debris X, by using GPS or the like. Here, it is also possible to observe the debris X with an observation device, such as a CCD camera or a laser radar, to estimate a model of motion of the debris X, and calculate the spot at which the harpoon 31 is to be shot. Then, as shown in FIG. 6C, the mother ship 5 is caused to approach the debris X, and the front end of the debris capture device 3 is brought into contact with the spot at which the harpoon 31 is to be shot. Note that, to bring the front end of the debris capture device 3 into contact with the surface of the debris X, the above-described robot arm 53 may be used, or the front end of the debris capture device 3 may be brought into contact with the surface of the debris X by shooting the debris capture device 3 from the end mass 2, at a distance close to the debris X.

When the front end of the debris capture device 3 comes into contact with the surface of the debris X, the harpoon 31 is shot, as shown in FIG. 5A, and the debris X is captured. After the capturing of the debris X, the mother ship 5 operates the robot arm 53 to separate the debris removal device 1 (the end mass 2), and departs, as shown in FIG. 7A. Next, the mother ship 5 moves to another piece of debris to be removed.

The debris removal device 1, separated from the mother ship 5, separates the end mass 2 from the debris capture device 3, as shown in FIGS. 5B and 5C, and causes the tether 4 to be released into outer space and deployed. Here, when the end mass 2 has the propulsion system 21, the deploying direction and the attitude of the tether 4 can be controlled by utilizing the propulsion system 21.

The following debris removal method can be carried out easily by using the debris removal device 1, including: the end mass 2 adapted to be capable of approaching the debris X to be removed; the debris capture device 3 separably-mounted on the end mass 2; and the tether 4 connecting the debris capture device 3 and the end mass 2 to each other. The debris removal method includes: an approach step of causing the debris capture device 3 to approach the debris X; an attitude correction step of correcting the attitude of the debris capture device 3; a capture step of capturing the debris X with the debris capture device 3; and a tether deployment step of releasing the tether 4 into outer space. In the attitude correction step, the debris capture device 3 obliquely approaches the surface of the debris X, and a part (the guide member 33) of the debris capture device 3 comes into contact with the surface of the debris X. Then, the attitude of the debris capture device 3 is corrected based on the contact point. In the tether deployment step, the end mass 2 is separated from the debris capture device 3 to release the tether 4 into outer space.

Accordingly, in the debris removal device 1 and the debris removal method according to this embodiment, the harpoon 31 is not shot at a distant place, but the shooting angle of the harpoon 31 is adjusted by causing the debris capture device 3 to approach the debris X and by bringing the guide member 33 into contact with the surface of the debris X. For this reason, the harpoon 31 can be shot at a position near the surface of the debris X at an appropriate shooting angle, hence the kinetic energy necessary to shoot the debris X can be reduced, and the reaction force can be reduced.

In addition, the harpoon 31 is shot after the shooting angle is adjusted at the near position. Hence, the possibility that the harpoon 31 will miss the debris X, be rebounded, or penetrate completely through the debris X can be reduced, so that the debris X can be captured precisely. In addition, since the harpoon 31 can be surely penetrated into the debris X, it is also possible to eliminate the need for a step of observing whether or not the harpoon 31 has penetrated into the debris X, or a device for such observation.

Figure 8A:
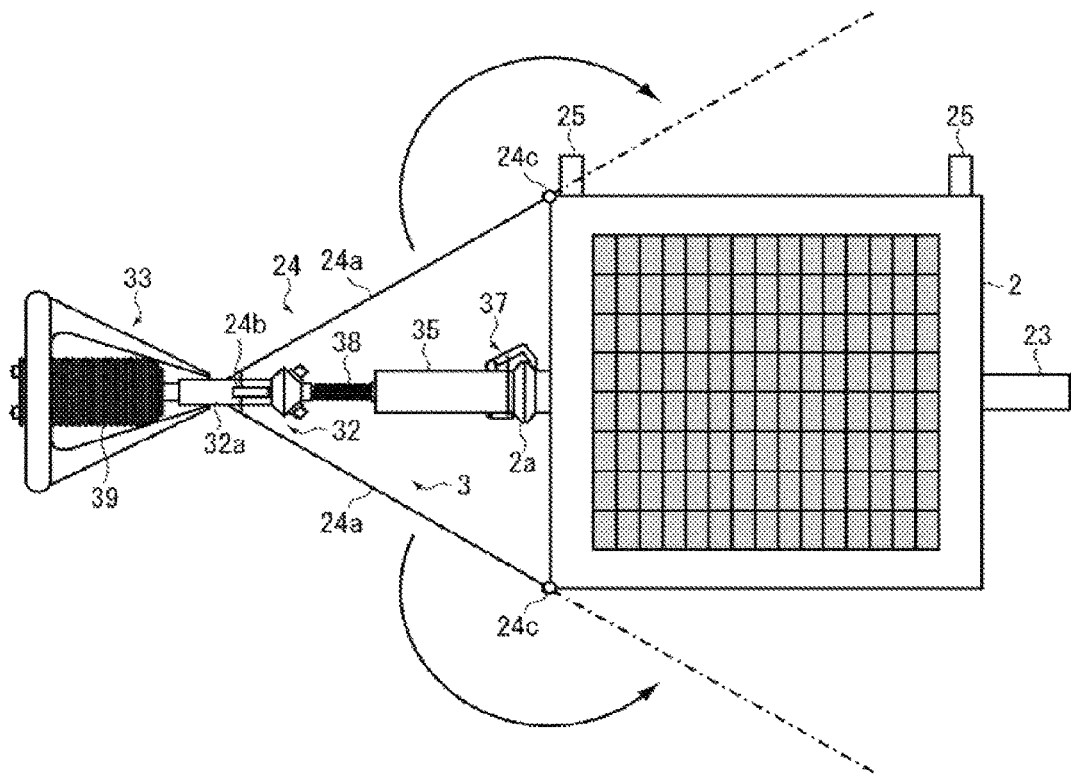
FIGS. 8A to 8B show a debris removal device according to a second embodiment of the present disclosure.
Figure 8B:
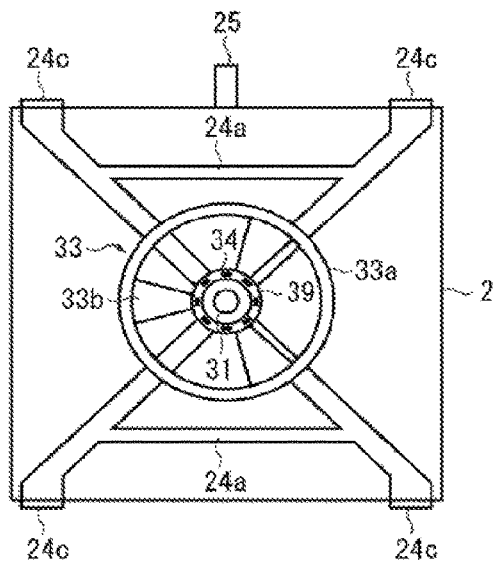
Figure 9A:
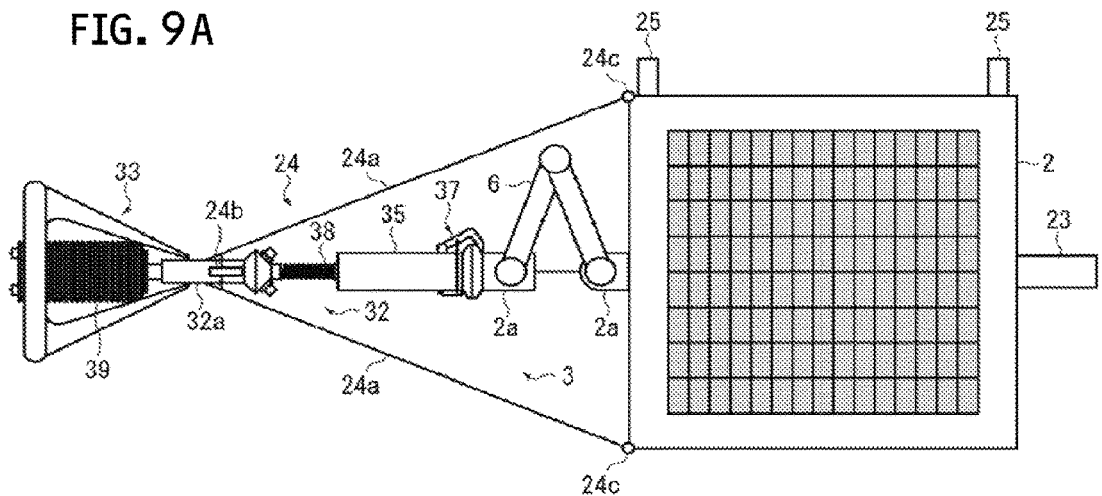
FIGS. 9A to 9B show debris removal devices according to some other embodiments of the present disclosure.
Figure 9B:
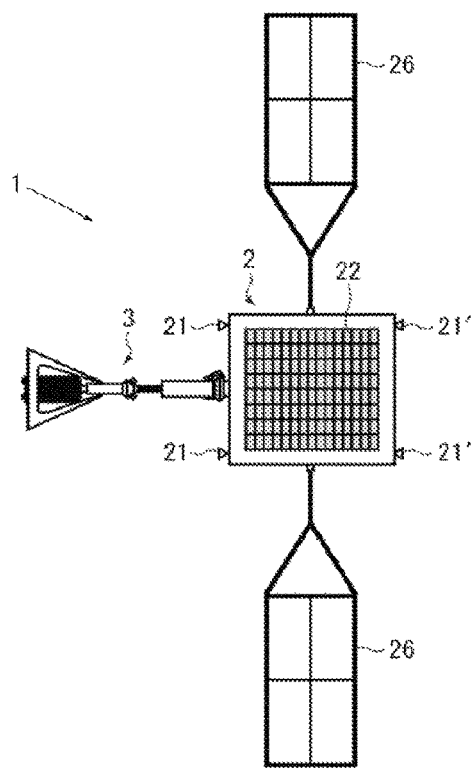
Figure 10:
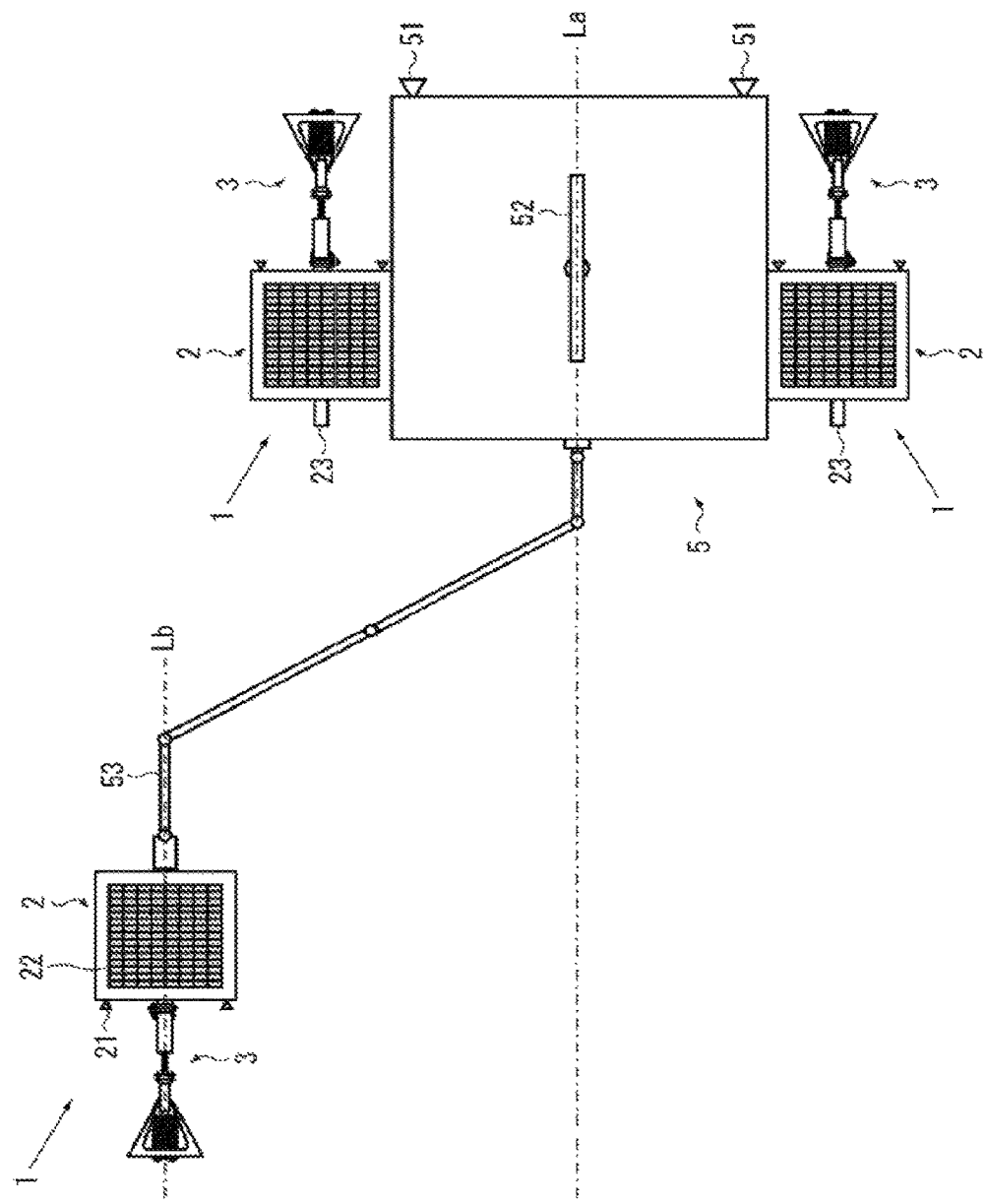
FIG. 10 is a side view showing a debris removal device according to a fifth embodiment of the present disclosure.

Next, debris removal devices 1 according to some other embodiments of the present disclosure are described with reference to FIGS. 8A to 10. Here, FIGS. 8A to 8B show a debris removal device according to a second embodiment of the present disclosure. FIG. 8A shows a side view, and FIG. BE shows a front view. FIGS. 9A to 9B show debris removal devices according to some other embodiments of the present disclosure. FIG. 9A shows a third embodiment, and FIG. 9B shows a fourth embodiment. FIG. 10 is a side view showing a debris removal device according to a fifth embodiment of the present disclosure. Note that constituents, which are the same as those of the above-described debris removal device 1 according to the first embodiment, are denoted by the same reference signs, and overlapping descriptions thereof are omitted.

In the second embodiment shown in FIGS. 8A and 8B, the end mass 2 includes a support device 24 that supports the shooting device 32. The support device 24 includes, for example, a pair of frames 24a each rotatably-connected to the end mass 2 via a hinge 24c, and a restraining device 24b that restrains the front end portions of both of the frames 24a to the shooting device 32.

The pair of frames 24a are provided at positions facing each other, with the shooting device 32 interposed therebetween, and holding the shooting device 32 therebetween. Each of the frames 24a has, for example, an A-letter shape as shown in FIG. 8B, and two-leg portions are each connected to the end mass 2. The restraining device 24b includes, for example, a wire that restrains the front end portions of the pair of frames 24a in a state of being in contact with the shooting device 32 (specifically, the cylinder 32a), and a wire cutter that cuts the wire. Note that the shape of the frames 24a and the configuration of the restraining device 24b are mere examples, and are not limited to the shape and the configuration shown in the drawings. In addition, the pair of frames 24a do not necessarily have to be provided, but a frame 24a may be provided on only one side.

Since the shooting device 32 is supported by the casing 35 via the buffer 38, it is possible to keep the positional relationship with the casing 35 (specifically, the state where the axes of the harpoon 31, the piston 32b, and the casing 35 are aligned on substantially the same straight line) in gravity-free outer space. On the other hand, for example, when the debris removal device 1 is handled on the ground, gravity acts on the shooting device 32, and when the debris removal device 1 is launched, acceleration acts on the shooting device 32. For these reasons, the front end portion of the debris capture device 3 tends to be tilted (the shooting device 32 tends to take a state of being inclined with respect to the casing 35) in such a case. In reference to the debris removal device 1 according to the second embodiment, the provision of the support device 24 makes it possible to support the shooting device 32 by the end mass 2, so that the tilting of the debris capture device 3 can be suppressed even in handling on the ground or at launch.

For example, at a stage of the approaching state shown in FIG. 6B, the support device 24 cuts the wire of the restraining device 24b to cause the frames 24a to retract to retraction positions, shown by the dashed-dotted lines in FIG. 8A. Note that, although not illustrated, it is also possible to provide springs or the like to the hinges 24c or the restrained portions for rotating the frames 24a to the retraction positions. In addition, a protrusion 25 formed on the surface of the end mass 2 is an example of a component for fixing the end mass 2 to the mother ship 5, as shown in FIG. 1. For example, the protrusion 25 is inserted through the fixation portion 54, which is an opening portion formed in the surface of the mother ship 5, and is restrained by a holding device.

In the third embodiment shown in FIG. 9A, a buffer 6 is provided which reduces the impact generated when the debris capture device 3 comes into contact with the surface of the debris X. The buffer 6 is provided, for example, at an intermediate portion of a tubular body constituting the tether release port 2a of the end mass 2, and includes a link mechanism, for example. The link mechanism links a front section and a rear section formed by, for example, dividing the tubular body of the tether release port 2a into two front and rear pieces. Here, the buffer 6 is shown which includes the two links, but the number of the links is not limited to that shown in the drawing. In addition, the buffer 6 may be one utilizing an elastic body such as a spring or rubber, or a component such as a bellows instead of the link mechanism.

In reference to the debris removal device 1 according to the third embodiment, for example, the frames 24a can be retracted at a stage of the approaching state shown in FIG. 6B, and the impact that is generated when the debris capture device 3 is brought into contact with the debris X, as shown in FIG. 6C, can be absorbed by the buffer 6.

In the fourth embodiment shown in FIG. 9B, the end mass 2 includes a propulsion system 21' for moving the debris capture device 3. The fourth embodiment makes it possible to carry out the operation of removing debris X by the debris removal device 1 alone, without mounting the debris removal device 1 on the mother ship 5. Accordingly, even when the number of the debris X to be removed is one, or the distance to the debris X to be removed next is large, the operation can be carried out efficiently.

In the fourth embodiment, the debris capture device 3 is caused to approach the debris X by utilizing the propulsion system 21'. Hence, the end mass 2 preferably includes solar cell paddles 26, constituting an electric power source. Note that, although not illustrated, it is also possible to provide the buffer 6, shown in FIG. 9A, between the end mass 2 and the debris capture device 3.

In the fifth embodiment shown in FIG. 10, the robot arm 53, shown in FIG. 1, is formed to be longer and configured to position the debris removal device 1 to a position not on a center line La of the mother ship 5. The debris removal device 1 is positioned such that, for example, a center line Lb of the debris removal device 1 can be in parallel with the center line La of the mother ship 5, at a position away from the center line La of the mother ship 5, as shown in the drawing. The fifth embodiment makes it possible to arrange the debris removal device 1 at a position suitable for the spot at which the harpoon 31 is to be shot, even when the mother ship 5 cannot approach the debris X close enough to locate the spot at which the harpoon 31 is to be shot on the center line La of the mother ship 5. Note that the robot arm 53 is not limited to having the configuration that is shown in the drawing, but, for example, may include a telescopic mechanism, so that both the state shown in FIG. 2 and the state shown in FIG. 10 can be dealt with.

In addition, in the fifth embodiment, the robot arm 53 can also be used as a buffer 6 by bending the robot arm 53. In addition, in the debris removal device 1 according to the third embodiment shown in FIG. 9A or the fourth embodiment shown in FIG. 9B, the arm of the buffer 6 may be formed longer, like the robot arm 53 shown in FIG. 10. This makes it possible to position the debris capture device 3 at a position off the center line of the end mass 2.

Several embodiments of the present disclosure are described above; however, each embodiment is a mere example described to facilitate the understanding of the present disclosure, and the present disclosure is not limited to the above-described embodiments. The technical scope of the present disclosure is not limited to specific technical matters disclosed in the above-described embodiments, but includes various modifications, alterations, alternative technologies, and the like which can be easily derived therefrom. For example, it is possible to apply a combination of any one, two, or more of the second to fifth embodiments with the first embodiment, and as a matter of course, such a mode is also within the technical scope of the present disclosure.

What is claimed is:

1. A debris removal device for removing debris drifting in outer space, comprising:
    a tether;
    an end mass system including a mass body for deploying the tether in outer space by utilizing gravity acting on the mass body, said end mass system adapted to approach debris to be removed;
    a debris capture device separably-mounted on the end mass system; and
    said tether connecting the debris capture device and the end mass system to each other,
    wherein the debris capture device includes
        a harpoon adapted to penetrate into the debris,
        a shooting device adapted to shoot the harpoon,
        a guide member positioned to come into contact with a surface of the debris to adjust a shooting angle of the harpoon with respect to the surface of the debris, and
        a switch adapted to send a shooting signal to the shooting device; and
    the end mass system adapted to be separated from the debris capture device and the tether adapted to be released to the outer space with the harpoon penetrated into the debris.

2. The debris removal device according to claim 1, wherein
    the debris capture device includes a buffer that reduces an impact generated when the harpoon is shot or comes into contact with the surface of the debris.

3. The debris removal device according to claim 1, wherein
    the guide member includes a rim portion disposed at a front end of the guide member and a spoke portion supporting the rim portion.

4. The debris removal device according to claim 3, wherein
the switch is disposed at a front end of the rim portion.

5. The debris removal device according to claim 1, wherein
the debris capture device includes a scattering prevention cover covering an outer periphery of the harpoon and having an opening portion positioned forward of a front end of the harpoon.

6. The debris removal device according to claim 5, wherein
the switch is disposed at a front end of the scattering prevention cover.

7. The debris removal device according to claim 1, wherein
the harpoon includes a flow path for releasing gas in the debris into outer space.

8. The debris removal device according to claim 1, wherein
the end mass system includes a support that supports the shooting device.

9. The debris removal device according to claim 1, wherein
the end mass system includes a thruster, or is mounted on a mother ship including a thruster.

10. The debris removal device according to claim 1, wherein
the shooting device includes a stopper mechanism that sets a penetration depth of the harpoon from the surface of the debris.

11. A debris removal method for capturing debris drifting in outer space, comprising:
using a debris removal device including an end mass system adapted to approach debris to be removed, a debris capture device separably-mounted on the end mass system, and a tether connecting the debris capture device and the end mass system to each other, wherein the debris capture device includes a harpoon adapted to penetrate into the debris and a shooting device adapted to shoot the harpoon;
causing the debris capture device to approach the debris;
correcting an attitude of the debris capture device obliquely approaching a surface of the debris, based on a contact point at which a portion of the debris capture device comes into contact with the surface of the debris;
capturing the debris with the debris capture device; and
separating the end mass system from the debris capture device to release the tether into outer space after the harpoon is penetrated into the debris.

* * * * *